United States Patent
Muldoon

[11] Patent Number: 5,884,409
[45] Date of Patent: Mar. 23, 1999

[54] APPARATUS FOR DETERMINING AND ADJUSTING LOFT OR LIE ANGLES OF GOLF CLUB

[76] Inventor: Douglas P. Muldoon, 39716 Muirfield La., Northville Township, Mich. 48167

[21] Appl. No.: 980,186

[22] Filed: Nov. 26, 1997

Related U.S. Application Data

[63] Continuation of Ser. No. 466,410, Jun. 6, 1995, abandoned.

[51] Int. Cl.⁶ ..................................................... G01B 5/24
[52] U.S. Cl. ............................................... 33/508; 72/293
[58] Field of Search ............................. 33/508, 534, 114; 72/293

[56] References Cited

U.S. PATENT DOCUMENTS

| | | |
|---|---|---|
| 2,953,048 | 9/1960 | Brown . |
| 2,973,581 | 3/1961 | Rhodehamel .............................. 33/508 |
| 3,194,038 | 7/1965 | Small et al. . |
| 3,292,928 | 12/1966 | Billen . |
| 3,357,219 | 12/1967 | Hunter . |
| 3,388,575 | 6/1968 | Fuzere . |
| 3,439,429 | 4/1969 | Sundstrom ................................. 33/508 |
| 3,965,714 | 6/1976 | Beard .......................................... 72/32 |
| 4,094,072 | 6/1978 | Erb ............................................ 33/508 |
| 4,167,268 | 9/1979 | Lorang . |
| 4,549,357 | 10/1985 | Hirose . |
| 4,580,350 | 4/1986 | Fincher . |
| 4,620,431 | 11/1986 | Muldoon ................................... 33/508 |
| 4,622,836 | 11/1986 | Long et al. . |
| 4,640,017 | 2/1987 | Cukon . |
| 4,655,457 | 4/1987 | Thompson . |
| 4,858,332 | 8/1989 | Thomas . |
| 4,875,293 | 10/1989 | Wakefield ................................. 33/508 |
| 4,928,397 | 5/1990 | Wang . |
| 4,934,706 | 6/1990 | Marshall . |
| 4,993,710 | 2/1991 | Marshall . |
| 5,421,098 | 6/1995 | Muldoon ................................... 33/508 |

OTHER PUBLICATIONS

Surrey Golf Catalogue 1995.

*Primary Examiner*—Christopher W. Fulton
*Attorney, Agent, or Firm*—Gifford, Krass, Groh, Sprinkle, Anderson & Citkowski, P.C.

[57] ABSTRACT

A device for clamping a golf club to a base including a clamping mechanism adapted to clamp the face of the golf club at a predetermined angle with respect to the base, and a measuring mechanism including at least a loft scale operational in combination with the clamping mechanism wherein the loft scale is pivotable about an axis parallel to the club face, further including measuring scales for reading loft angles of the club and optionally including scales for measuring the lie angle of the club.

13 Claims, 3 Drawing Sheets

APPARATUS FOR DETERMINING AND ADJUSTING LOFT OR LIE ANGLES OF GOLF CLUB

This is a continuation of application Ser. No. 08/466,410 filed on Jun. 6, 1995 now abandoned.

BACKGROUND OF THE INVENTION

1. Field of the Invention

The present invention relates to golf club adjusting devices and in particular to golf club adjusting devices which measure the loft or lie angles of a golf club and permit the golf club to be adjusted accordingly.

2. Description of the Relevant Art

A pervasive problem in the golf industry is the accuracy and predictability of a golf club's performance, and in particular with respect to the loft and lie angles of a club. Although all clubs of a particular design are presumably manufactured according to the same guidelines and specifications, an individual club may not actually have lie or loft angles which meet manufacturer's specifications. Moreover, a golfer may want to reset a club's loft or lie angles in conformity with the golfer's swing. Hence, the measuring and adjustment of golf clubs has evolved into a science.

The prior art, in particular U.S. Pat. No. 4,620,431 to Muldoon teaches that to properly fit a golf club to an individual player, the club should be fitted from "a playing position." By way of background, the basic elements of a golf club include a club head, a shaft upwardly extending from the head and can also include a hosel connected to the club head for receiving the shaft. The club head further includes a face including a plurality of parallel score lines and a sole. The sole of some golf clubs, woods, for example can be curved. Muldoon teaches that a clamped golf club is rotated until the club head is in a plane horizontal to the ground with the score lines being parallel to the ground regardless of the sole radius; i.e. the club is clamped in a soled position. Further, Muldoon teaches that the shaft of the club must be in a plane vertical to the plane in which the club head lies. Both U.S. Pat. No. 4,620,431 and pending U.S. patent application No. 07/926,945 are incorporated by reference herein.

Unlike the prior art, the present invention teaches an apparatus for determining the loft or lie angles of a golf club wherein the golf club is held stationary at some predetermined angle with respect to the base. A measuring apparatus is brought into proximity with the golf club shaft so that loft or lie angles can be measured from the clamped club. Loft or lie angles can then be adjusted where necessary.

Both the loft and lie angles affect the path of the ball after it is struck by the club head. The lie angle determines whether the ball will travel left or right as it is launched. Loft angles, on the other hand, are the angles that a club face makes with the vertical shaft plane (or any plane parallel to the vertical shaft plane) when the sole of the club is parallel to the ground line. The club's loft and the lie angles affect the vertical trajectory of the ball which is further affected by the swing of the golfer; therefore, to optimize the height and distance that the ball travels, the lie and loft of the club should further be adjusted to the particular player's swing. Once the loft and lie angles of the club have been measured, the hosel of the club is bent to change either or both of these angles to some other desired angle which is better adapted for a particular player's swing or in conformity with manufacturer's specifications.

SUMMARY OF THE INVENTION

In the past, devices for measuring the loft or lie angles of a golf club which operated from a fixed position proved inaccurate with off-set and progressive off-set, non-offset and face progression clubs. The present invention overcomes this drawback by moving the measuring devices to the club and clamping the club so that the club face is at a fixed angle. The present invention, then, allows the club to be fixed at a predetermined point-of-reference while permitting measurements to be taken from clubs having various head designs including off-set, progressively off-set, non-offset and face progression clubs. Hence, the present invention provides clamping means which permits the golf club to be held at a fixed angle with respect to the base in combination with loft and lie scales which measure the respective angles of the club in its clamped position.

According to the present invention, the clamping mechanism remains stationary while the loft and/or lie scales are movable about the fixed clamping mechanism. In particular, the present invention is directed toward a loft scale which pivots about an axis parallel to the club face angle and which is slidable in a plane which lies at a predetermined angle (36° in the preferred embodiment) with respect to the club face.

DETAILED DESCRIPTION OF THE PREFERRED EMBODIMENT

The drawings disclose a preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Figure 1:
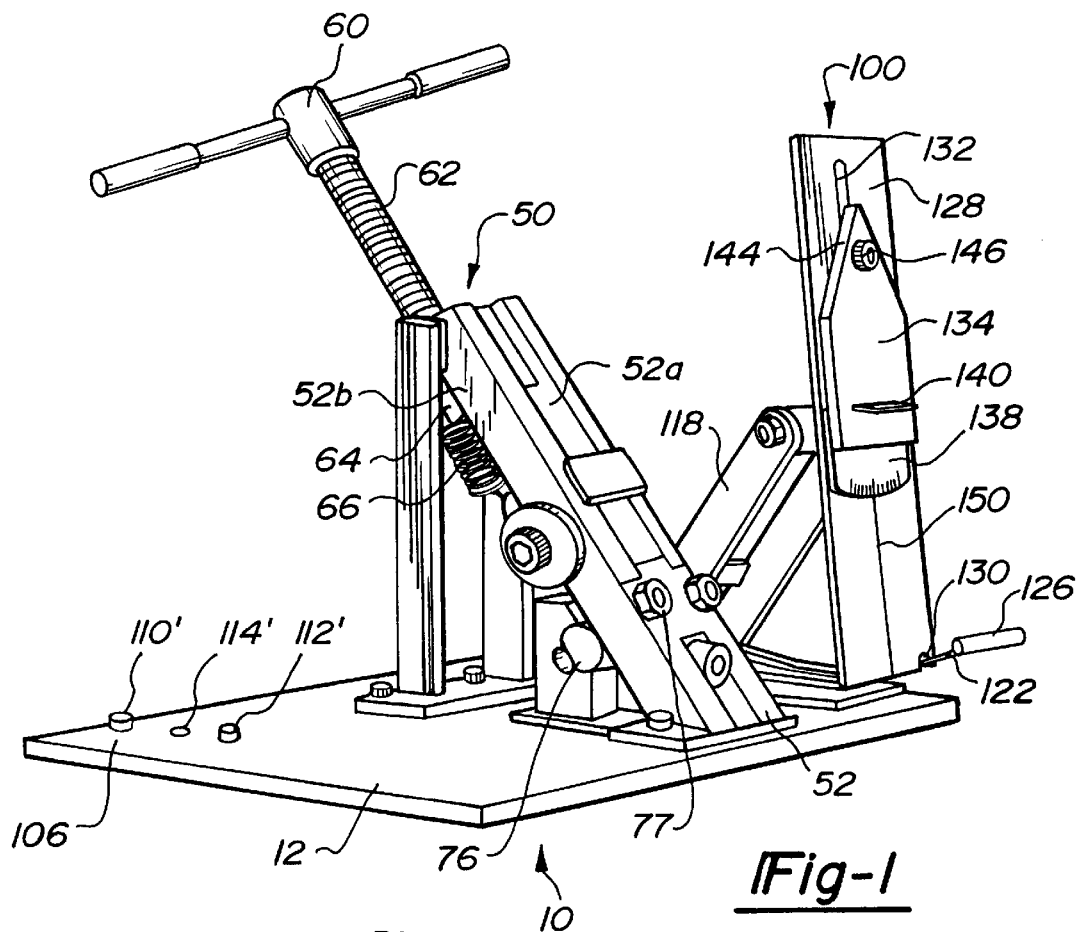
FIG. 1 shows an oblique view of the preferred embodiment including measuring means for determining both loft and lie angles of a golf club.

FIG. 1 is an oblique drawing of a preferred embodiment of the invention 10 which includes, broadly, a clamping mechanism shown generally at 50 and a measuring mechanism, shown generally at 100, both being mounted to a base 12. In operation, the head of the club is securely clamped within the clamping mechanism 50, enabling the shaft of the club to engage with the measuring mechanism 100 in such a way that loft and/or lie angles may be ascertained from scales associated with the measuring mechanism.

Figure 2:
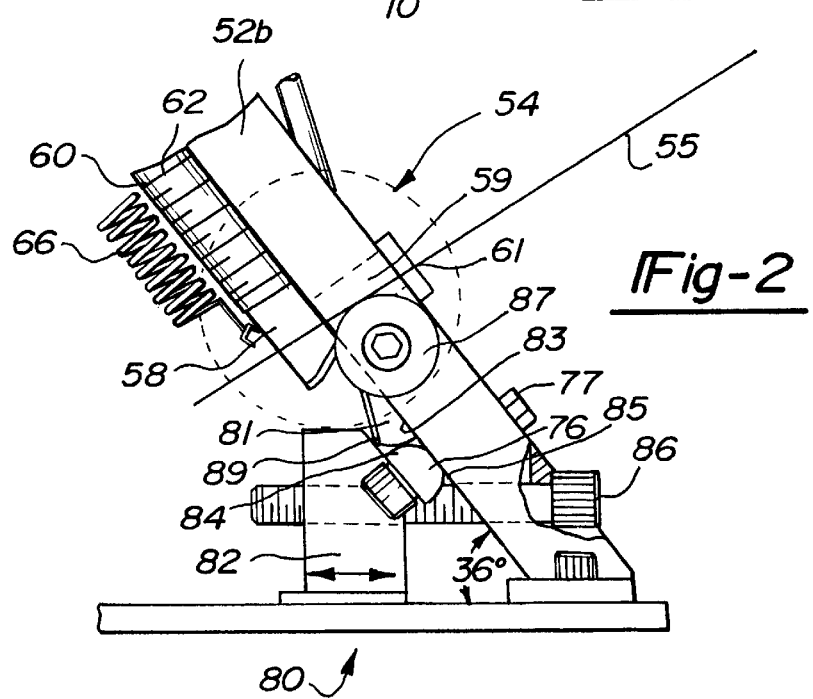
FIG. 2 shows a side view elevation illustrating the club head clamping mechanism, detailing the area in which the club head is clamped.

FIG. 2, as generally referenced by segmented circle 54, perhaps shows most clearly how a club head 81, having a face 83, is securely clamped within the clamping mechanism 50 such that the face 83 is flush against a surface 85 associated with the clamping mechanism 50. To carry out this clamping, the club head 81 is placed in the mechanism 50 such that the sole of the club rests firmly against one or more sole clamps 76. In the preferred embodiment, two such sole clamps 76 are used, with one not being visible in the figures, to provide a better alignment with the sole of the club relative to the mechanism. For the same reason, these sole clamps are preferably semi-cylindrical in shape as shown in FIG. 2, as opposed to being square or having flat surfaces. Although a single sole clamp could be used, and may be fixed in terms of alignment, a level of adjustment is provided by nuts 77 which, when loosened, enable the sole clamp 76 to be moved slightly to better match the physical characteristics of the club sole. Additionally, in the event the invention is used in conjunction with a wood as opposed to an iron, sole clamps 76 may be removed using nuts 77, as they would be obstructions in such a case.

With the sole of the club 81 resting against the sole clamps 76, a slidable head grip 58 is moved downward onto the top portion of the club head 81 by movement of a T-handle 60 having threads 62 which engage with a threaded nut 64 forming part of the assembly. To facilitate smooth and consistent sliding of the head grip 58, the clamping mechanism 50 includes two rails 52a and 52b, and the headgrip 58 includes a neck portion 59 disposed between the two rails 52a and 52b. Neck portion 59 further connects to a plate 61 which rides against the upper surfaces of the two rails 52a and 52b. As best seen in FIG. 2, the clamping mechanism 50 further preferably includes an adjustable toe stop 87, which includes a threaded portion enabling adjustment into and out of the plane of FIG. 2, thereby providing a surface against which the toe portion of club 81 comes in contact prior or during clamping within the mechanism. The headgrip 58 is also rotatable about an axis 55, enabling the portion of the headgrip 58 which engages with the club head 81 to be moved and adjusted prior to clamping for a more secure engagement. Also in the preferred embodiment a tension spring 66 is provided to stabilize movement of the headgrip 58 as it is moved down onto the club head 81.

The clamping mechanism 50 further includes a rear clamping mechanism, shown generally at 80, which includes an upstanding block 82 which is slidable from side to side with respect to FIG. 2 through the turning of a bolt 86. As the block 82 slides rightwardly with respect to FIG. 2, a beveled surface 84 makes contact at point 89 with respect to the club head 81. Thus, through the combination of sole clamps 76, head clamp 58, and rear clamp 82, the face 83 of club head 81 is held flush against the surface 85 of the clamping mechanism 50. It will be appreciated to those of skill in the art that various other clamping mechanisms which add or subtract from the facilities just described may also be used, so long as the head of the club is held flush to the mechanism.

Figures 4, 5:
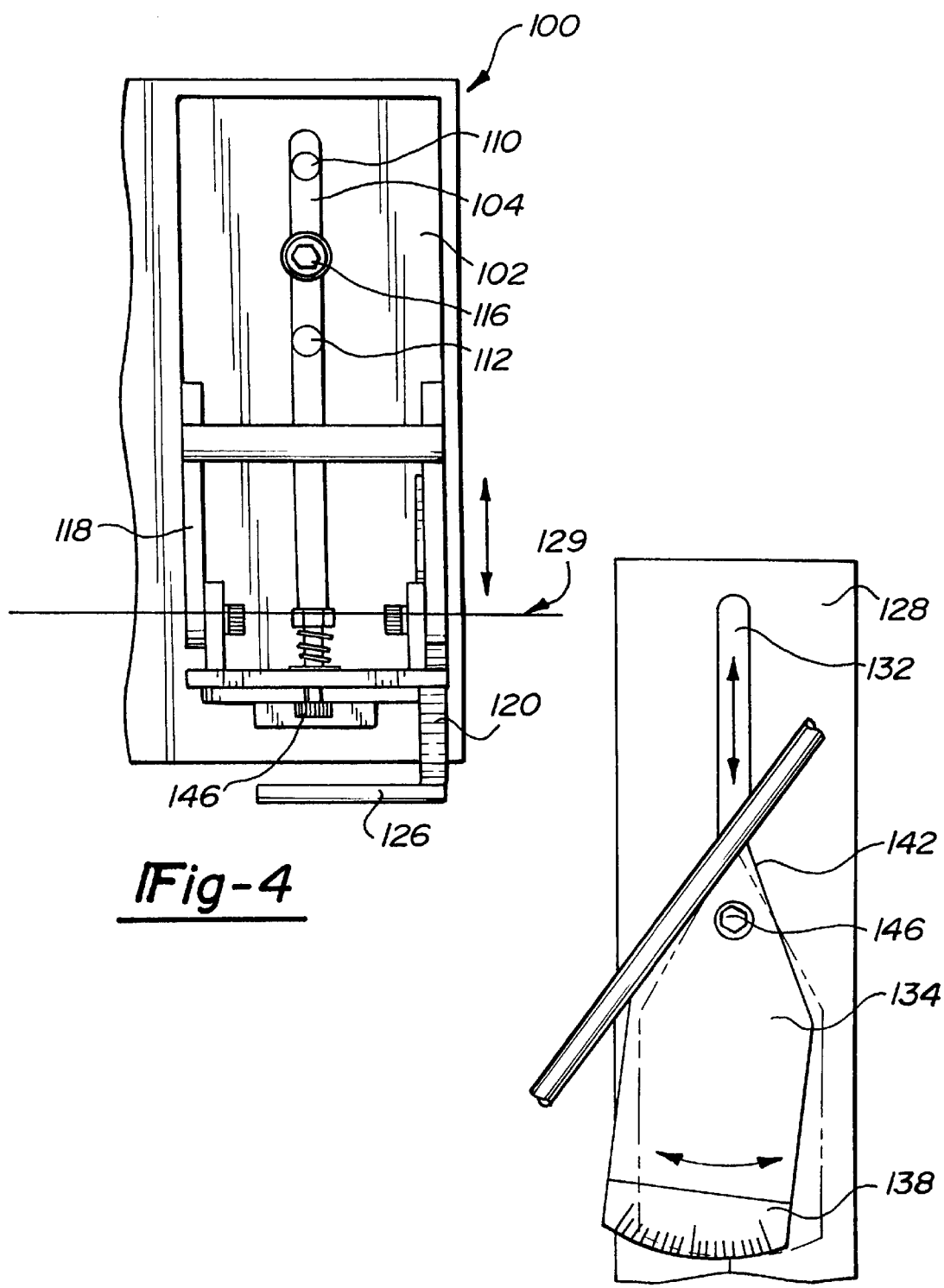
FIG. 4 is a top view of the measuring mechanism illustrating the loft scale.
FIG. 5 is a frontal view of the shaft abutment plate including a lie plate and lie scale.

The measuring mechanism 100 will now be described in further detail. The measuring mechanism 100 includes a plate 102 which is slidable in a plane horizontal with respect to the base 12. FIG. 4 is a top-down view of this assembly, which illustrates a slot 104 and guide posts 110 and 112 which cause the sliding of plate 102 to remain substantially linear with respect to the base 12. As shown in FIG. 1, the base 12 includes a second set of guide posts 110' and 112' and other features 114 for supporting tensioning nut 116, enabling the entire measuring mechanism 100 to be moved to the other side 106 of the clamping mechanism 50 so that either right- or left-handed clubs can be measured and adjusted. In addition to the guide post 110 and 112, the assembly preferably includes a tensioning nut 116 located therebetween to assist in stabilizing the position of the plate 102 during the taking of a measurement.

The measuring mechanism 100 also includes a pair of angularly upright braces 118 mounted in a fixed position with respect to the slidable plate 102. The assembly also includes a radiused member 122 having a scale 120, the function of which will be evident from the discussion below. The radiused member 122 and scale 120 are permanently mounted against the slidable plate 102 and angled upright braces 118.

The measuring assembly further includes a shaft abutment plate 128 which is pivotally mounted with respect to the braces 118 for rotation about axis 129 which is substantially parallel to the base 12. Onto the shaft abutment plate 128 there is mounted a lie plate 134, having a lie scale 138 and a handle 140 which assists in positioning the lie plate during use. The lie plate 134 includes two sloped surfaces 142 and 144, and is further apertured to enable a nut and bolt assembly 146 to extend through the lie plate 134 and engage with an elongated slot 132 formed in the shaft abutment plate 128. The shaft abutment plate 128 further includes a centralized score mark 150 enabling values to be read directly from the lie scale in operation. The lie plate 134 includes two sloped surfaces 142 and 144, and values on both sides of the lie scale, again, to accommodate right- and left-handed clubs. The measuring mechanism 100 optionally includes a handle 126 enabling the user to slide the assembly forward and backward with respect to the base 12. The shaft abutment plate 128 also includes a notch portion 130 directly above the scale 120 on radiused member 122 to enable the user to better view values on the scale 120 which might otherwise be obscured by the edge of the shaft abutment plate 128.

In operation, the head of the club 81 is clamped within the clamping mechanism 50 in the manner described above, so that the shaft extends upwardly and outwardly from the mechanism 50, more or less in free space. The user then manipulates the measuring mechanism 100 to enable loft angle to be read directly from 120, and lie angle to be read directly from scale 138 relative to the score mark 150. It should be noted that although, in the preferred embodiment, the measuring mechanism includes both scales for loft and lie measurement, these angles being independent of one another, alternative measuring mechanisms may be used wherein either loft or lie, but not both may be ascertained from a single measuring mechanism.

Having clamped the club head 81 into the clamping mechanism 50, typically the user first grasps handle 126 and slides the entire measuring device 100 in closer proximity with the shaft of the club. Due to this general slidability of the measuring mechanism 100, in a plane horizontal to the base, the mechanism 100 may accommodate shafts which are offset from center relative to the club head. To those skilled in the art, this invention fully accommodates offset progressively offset, non-offset and face progression clubs. Having brought the measuring mechanism proximate to the shaft of the club, the shaft abutment plate 128 may be rotated into a plane parallel to the axis of the shaft where it engages therewith, and the lie plate 134 may be positioned and pivoted so that the appropriate sloped surface 142, 144 rests against the shaft of the club, also resting against the shaft abutment plate 128, enabling the user, in this particular embodiment, to read directly both loft angle from scale 120 and lie angle from scale 138 relative to the score mark 150. As an alternative to the taking of a measurement of these angles, the user may set the shaft abutment plate for a particular desired angle relative to the scale 120, and, if the shaft is not already in alignment therewith, bend the hosel of the club to ensure that a particular loft angle is accommodated. In the event that the club is not equipped with a hosel, the shaft of the club may be bent directly, through such a procedure should be carried out delicately to ensure that the club is not damaged.

Having set loft angle by bringing the shaft of the club in alignment with the abutment plate 128, lie angle may either be measured or, as an alternative, be set to a desired value with the shaft of the club, preferably at the hosel, being again bent to meet that setting.

It will be noted that the angle formed by the face fixture 52 with respect to the base 12 and the angle formed by the upright braces 118 with respect to the base are preferably the same, 36 degrees, which represents an angle more or less midway between typical loft angles ranging from 11 to 61 degrees. By having the angles associated with the clamping mechanism 50 and measuring mechanism 100 identical, it enables the shaft abutment plate 128 to be positioned substantially vertically at a loft angle of 36 degrees, this being a common midpoint value. With such an arrangement, the shaft abutment plate pivots about an axis 129 which is parallel to the face fixture 52, and therefore parallel to the club face 83, which is at a 36° angle with respect to the base. Thus, the face fixture 52 and upright braces 118 must have substantially identical angles in order to insure accuracy of the loft reading. Where the loft and lie scales are formed on a single device such calibration between the braces 118 and the face fixture 52 also affects the accuracy of the lie angle reading.

As mentioned, the measuring mechanism 100 need not include both loft and lie scales, as these are independent attributes of a club. For example, one might bring a portable loft scale into proximity with the side of the clamping mechanism 50 and, by visually aligning this loft scale with the angle of the club shaft when clamped, independently ascertain loft angle without the need for including the loft angle measurement aspect within the measuring mechanism 100. As an alternative, such a loft measuring aspect may be included in a semi-permanent or permanent manner against either or both sides of the clamping mechanism 50.

Figure 3:
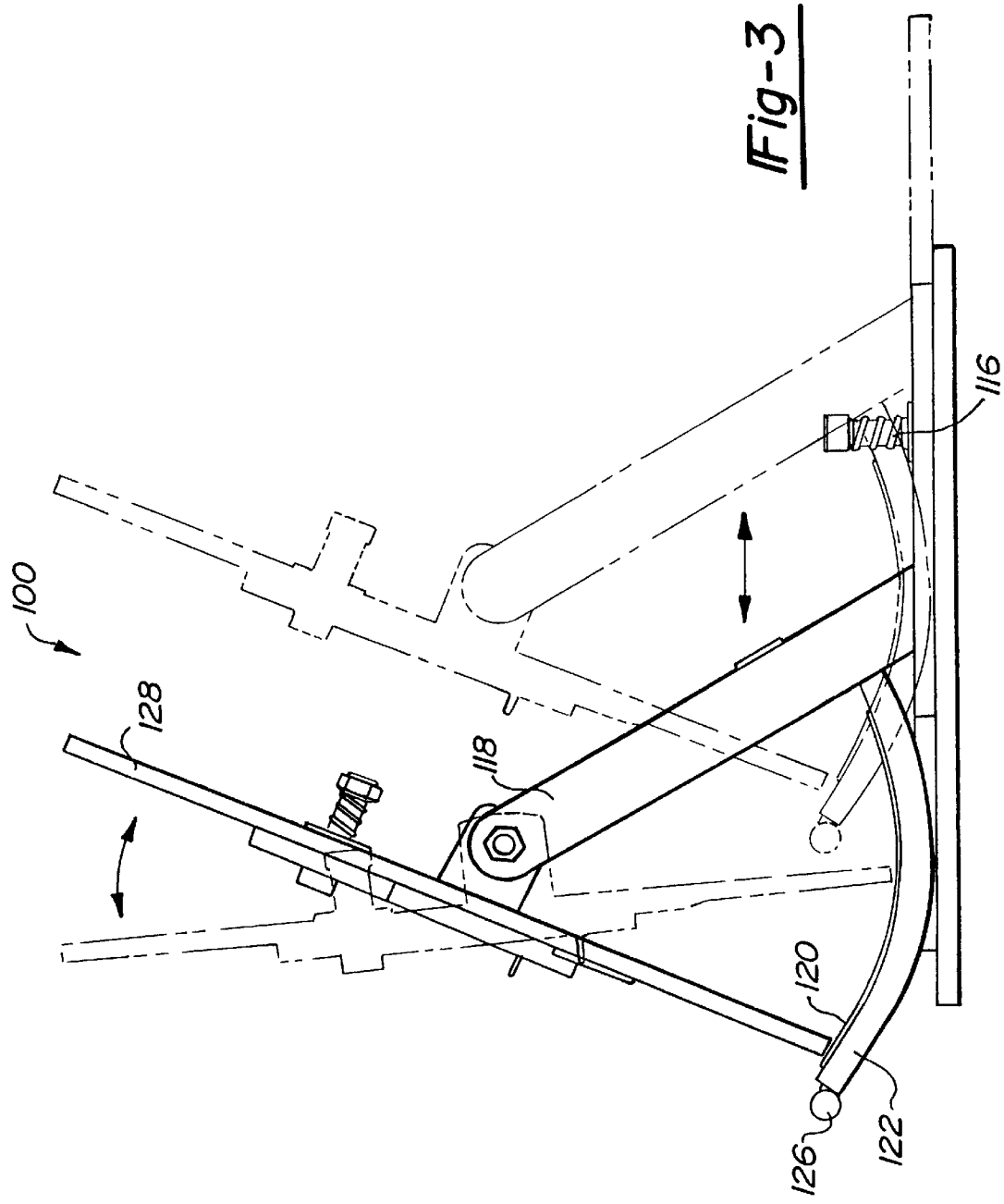
FIG. 3 is a side view of the measuring mechanism of the invention and shows the sliding and pivoting aspects of the shaft abutment plate.

Although the embodiments described thus far have been entirely mechanical in nature, one or both of the angle measuring aspects of this invention may be supplemented or replaced through electronic means. For example, with respect to loft angle, referring back to FIG. 3 and FIG. 4 in particular, it is noted that in order to read loft angle from scale 120, shaft abutment plate 128 is pivoted about axis 129. In an electronic version, the rotation about axis 129 may include a shaft encoder, much like those used in conjunction with stepper motors to determine angular displacement, and the output of this sensor may feed appropriate electronics which, once calibrated, may in turn feed a digital numeric readout to provide a direct reading of loft angle. In this electronic alternative embodiment, the need for radiused member 122 and scale 120 would thereby be obviated, and, additionally, the shaft abutment plate may be made shorter in length as engagement with the shaft abutment plate and scale 120 would no longer be necessary. In like manner, in place of lie scale 138, a second shaft encoder could be used with respect to axis of rotation defined by the nut and bolt assembly 146, to enable a second, independent electronic readout of the lie angle.

In terms of further alternative embodiments, although the mechanisms just described, whether mechanical or electronic, have been primarily directed toward irons, the invention is in no way limited to this type of club, but may accommodate both woods and putters as well. In the case of a wood, as the face of the typical wood has a curved convex face, accommodation will preferably be required to ensure that the head of the club is securely clamped with respect to face fixture, despite this face. One means for solving this problem is to provide a series of shaped spacers, each having a first surface which substantially conforms to the face of the wood and a second surface which is substantially planar for engagement against the surface 85 of the clamping mechanism. Such a shaped spacer may be constructed of a plastic resin which may be formed in advance of the wood clamping process on a customized basis. The radiused sole of a wood also requires the addition of a sole wedge resting on the base 12 having a concave surface for accommodating a curved wood sole. As is known in the art, face angle scales would further be required. In the preferred embodiment, face angle scale plates for woods would be positioned slidable on the base with respect to the slidable plate 120 and pivotable about an axis vertical with respect to the base. In terms of putter accommodation, since the shaft of a putter is not as dramatically angled with respect to the head as in irons or woods, typically the shaft will be much more vertical when clamped within the clamping mechanism 50, which would require that the measuring mechanism 100 be moved closer to the clamping mechanism 50 to capture the putter shaft. Those skilled in the art, and in particular the Muldoon art, have an appreciation for adding face angle scales to angle machines to accommodate woods.

Having described my invention, additional embodiments will become apparent to those skilled in the art to which it pertains without deviating from the scope of the appended claims.

I claim:

1. A device for measuring and adjusting angles of a golf club head having a head with a face and a shaft extending therefrom, comprising:

a mechanism for clamping the golf club head so that the shaft of the club extends freely therefrom; and a measuring mechanism, including:

an adjustable shaft abutment plate which may be moved into parallel alignment with the golf club shaft, and a loft angle scale supported relative to said shaft-abutment plate, enabling a loft angle to be read from the club head upon alignment;

wherein said clamping mechanism allows for arbitrary alignment for clamping of said golf club head within said clamping mechanism for reading said loft angle.

2. The golf club angle measuring device as set forth in claim 1, wherein a lie scale is pivotally mounted on said shaft-abutment plate.

3. The golf club angle measuring device as set forth in claim 2, wherein said lie scale is slidable along said shaft-abutment plate.

4. The golf club angle measuring device as set forth in claim 1, further comprising a lie scale pivotable in the plane in which said golf club head face rests when said golf club head face is in a clamped position.

5. A device for measuring and adjusting the loft angle of a club having a head with a face and a shaft extending from the head, said device comprising:

a base;

a golf club clamping mechanism mounted to said base, including:

a face fixture secured at a predetermined angle with respect to said base, said predetermined angle being representative of a mid-range loft angle, means for locking the face of the golf club in flush relation against said face fixture at an arbitrary position within said face fixture, an angle measuring mechanism removably secured to said base, including:

a loft scale slidably secured relative to said base;

an adjustable shaft-abutment plate adapted to be oriented substantially vertically with respect to said base when the loft angle of the club head is equal to said predetermined angle, said shaft-abutment plate being pivotable in relation to said loft scale so that a loft angle can be read from the golf club head when said abutment plate is aligned parallel relation to the golf club shaft.

6. The golf club angle measuring device as set forth in claim 5, further comprising a lie scale pivotable in the plane in which said golf club head face rests when said golf club head face is in a clamped position.

7. The golf club angle measuring device as set forth in claim 5, wherein a lie scale is pivotally mounted on said shaft-abutment plate.

8. The golf club angle measuring device as set forth in claim 7, wherein said lie scale is slidable along said shaft-abutment plate.

9. A golf club angle measuring device for use with a golf club head clamp mounted to a base for clamping a golf club having a head with a face and a shaft extending therefrom, comprising:

a plate slidable in a plane parallel to said base;

an angularly upward brace mounted to said slidable plate at a predetermined angle with respect to said base;

a shaft-abutment plate, pivotable about an axis extending from the opposite end of said brace and parallel to said base;

a loft scale mounted in relation to said plate so that when said shaft-abutment plate is in parallel relation to the shaft of the golf club, the shaft-abutment plate is aligned with an angle value on said loft scale;

wherein said golf club head is mounted within said golf club head clamp at an arbitrary position.

10. The golf club angle measuring device as set forth in claim 9, wherein a lie scale is pivotably mounted on said shaft-abutment plate.

11. The golf club angle measuring device as set forth in claim 10, wherein said lie scale is slidable along said shaft-abutment plate.

12. The golf club angle measuring device as set forth in claim 9, further including a golf club clamping means for clamping a golf club head at an angle equal to said predetermined angle.

13. The golf club angle measuring device as set forth in claim 12, further comprising a lie scale pivotable in the plane in which said golf club head face rests when said golf club head face is in a clamped position.

* * * * *